(12) United States Patent
Winemiller et al.

(10) Patent No.: US 9,760,515 B2
(45) Date of Patent: Sep. 12, 2017

(54) SHARED CONTROL OF A PHASE LOCKED LOOP (PLL) FOR A MULTI-PORT PHYSICAL LAYER (PHY)

(71) Applicant: QUALCOMM Incorporated, San Diego, CA (US)

(72) Inventors: Chad Everett Winemiller, Cary, NC (US); Dror Barash, Shoham (IL); Russell Coleman Deans, Chapel Hill, NC (US); Mark Wesley Vilas, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 14/679,436

(22) Filed: Apr. 6, 2015

(65) Prior Publication Data

US 2016/0292112 A1    Oct. 6, 2016

(51) Int. Cl.
| | |
|---|---|
| *G06F 13/00* | (2006.01) |
| *G06F 13/372* | (2006.01) |
| *G06F 13/40* | (2006.01) |
| *G06F 13/42* | (2006.01) |
| *G06F 1/32* | (2006.01) |

(52) U.S. Cl.
CPC .............. *G06F 13/372* (2013.01); *G06F 1/32* (2013.01); *G06F 1/3206* (2013.01); *G06F 13/4068* (2013.01); *G06F 13/4282* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 7,369,069 B2 * | 5/2008 | Usugi | ................ G06F 1/24 341/100 |
| 7,778,313 B2 | 8/2010 | Agazzi | |
| 8,249,097 B2 | 8/2012 | Kenkare | |
| 8,488,699 B2 | 7/2013 | Barkan | |

(Continued)

OTHER PUBLICATIONS

International Search Report and Written Opinion for PCT/US2016/020352, dated Jun. 15, 2016, 10 pages.

*Primary Examiner* — Farley Abad
*Assistant Examiner* — Richard B Franklin
(74) *Attorney, Agent, or Firm* — Withrow & Terranova, PLLC

(57) ABSTRACT

Methods and systems for shared control of a phase locked loop (PLL) for a multi-port physical layer (PHY) are disclosed. In one aspect, an arbitration logic circuit is coupled to ports of a multi-port PHY sharing a phase locked loop (PLL). Upon receiving an indication that the shared PLL is to be reset, the arbitration logic circuit commands the ports sharing the PLL to enter a state in which any reset of the shared PLL would have minimal or no effect in their operations. In this manner, an integrated circuit (IC) including a multi-port PHY may be configured with only one PLL and associated clock generating logic to provide a clock signal for some or all of its ports, thus reducing its semiconductor area and power consumption. Furthermore, the ports of the multi-port PHY may operate independently from each other obviating any configuration and/or interoperability problems associated with having a shared PLL.

25 Claims, 6 Drawing Sheets

(56) References Cited

U.S. PATENT DOCUMENTS

| | | |
|---|---|---|
| 2002/0199026 A1 | 12/2002 | Tsunashima et al. |
| 2007/0043884 A1 | 2/2007 | Watanabe |
| 2010/0005327 A1 | 1/2010 | Murata |
| 2014/0112339 A1 | 4/2014 | Safranek et al. |
| 2014/0269471 A1 | 9/2014 | Wagh et al. |

* cited by examiner

SHARED CONTROL OF A PHASE LOCKED LOOP (PLL) FOR A MULTI-PORT PHYSICAL LAYER (PHY)

BACKGROUND

I. Field of the Disclosure

The technology of the disclosure relates generally to phase locked loops (PLLs) shared by multiple devices.

II. Background

Circuits within computing devices generally communicate through a bus according to a particular bus standard (e.g., Peripheral Component Interconnect Express (PCIe), Universal Serial Bus (USB) version 3 (USB3), etc.). The interface between the circuits and the bus is generally known as a physical layer (PHY) of a communication protocol stack used by the circuits to communicate. The PHY is the first layer of the Open System Interconnection Model (OSI Model). The PHY deals with bit-level transmission between different devices and supports electrical or mechanical interfaces connecting to the physical medium for synchronized communication.

A bus operating according to a particular bus standard may have multiple links for connecting integrated circuits (ICs) of a system (for example, a central processing unit (CPU), memory, communication modules, etc.). A PHY port on a first IC transmits and/or receives, for example, data packets to and/or from a PHY port on a second IC through a corresponding link. The two ports that comprise a communication link may have one or more lanes; each lane is used as a full-duplex communication channel between the first and second ICs. The throughput between the first and second ICs may be increased by increasing the number of lanes of the corresponding link. When using multiple lanes, the data packets transmitted through the multi-lane link may be interleaved across the multiple lanes by a transmitting element and reassembled at a receiving element.

In some instances, the PHY of an IC using the bus may be a multi-port PHY. Each port of the multi-port PHY is configured to operate independently from other ports of the multi-port PHY. Each port is connected to a distinct link of the bus, such that each port may work concurrently with, but independently from, the other ports of the multi-port PHY. In many instances, the multiple ports of the multi-port PHY will need a clock signal for communicating through their corresponding links. Accordingly, each port will include a phase locked loop (PLL) and other clock logic to generate a corresponding clock signal. However, having a PLL and other clock logic for each port increases the area and power consumption in the IC. Therefore, in applications where area and power consumption are limited, some or all ports of an IC's multi-port PHY may be configured to share a single PLL, thus providing for reduced semiconductor area and power consumption.

Sharing the PLL, however, may lead to problems, as an unexpected variation in the shared PLL may affect one or more of the ports sharing the PLL. For example, if a port of the multi-port PHY causes a reset or re-initialization of the shared PLL, some or all of the other ports sharing the PLL may experience communication errors and/or loss of data.

SUMMARY OF THE DISCLOSURE

Aspects disclosed in the detailed description include shared control of a phase locked loop (PLL) for a multi-port physical layer (PHY). In particular, an arbitration logic circuit according to the exemplary aspects of the disclosure is coupled to ports of a multi-port PHY sharing a PLL. Upon receiving an indication that the shared PLL is to be reset or re-initialized by one of the ports, the arbitration logic circuit commands the other ports sharing the PLL to enter a state in which a reset of the shared PLL would have minimal or no adverse effect in their operations. In this manner, an integrated circuit (IC) including a multi-port PHY may be configured with only one PLL and associated clock logic to provide a clock signal for some or all of its ports, thus reducing the system's semiconductor area and power consumption. Furthermore, the ports of the multi-port PHY may otherwise operate independently from each other, obviating any configuration and/or interoperability problems associated with having a shared PLL.

In this regard, in one aspect, a method for controlling a multi-port PHY is provided. The method comprises providing, by an arbitration logic circuit coupled to a plurality of port controllers of a multi-port PHY and to a PLL of the multi-port PHY, a command to enter a low power mode to a first port controller of the plurality of port controllers in response to a PLL reset request from a second port controller of the plurality of port controllers. The method further comprises providing, by the arbitration logic circuit, a PLL reset command to the PLL in response to an indication that the first port controller has entered the low power mode.

In another aspect, an IC is provided. The IC comprises an arbitration logic circuit, a PLL coupled to the arbitration logic circuit, and a plurality of port controllers of a multi-port PHY, wherein at least a first port controller and a second port controller of the plurality of port controllers are coupled to the PLL. The arbitration logic circuit is configured to provide a command to enter a low power mode to the first port controller in response to a PLL reset request from the second port controller, and provide a PLL reset command to the PLL in response to an indication that the first port controller has entered the low power mode.

In another aspect, an IC is provided. The IC comprises a means for arbitrating a reset of a means for generating a clock signal, the means for generating the clock signal coupled to the means for arbitrating the reset. The IC also comprises a plurality of means for controlling a port of a multi-port PHY, wherein at least a first means for controlling a first port and a second means for controlling a second port of the plurality of means for controlling a port are coupled to the means for generating the clock signal. The means for arbitrating the reset is configured to provide a command to enter a low power mode to the first means for controlling the first port in response to a PLL reset request from the second means for controlling the second port, and provide a PLL reset command to the means for generating the clock signal in response to an indication that the first means for controlling the first port has entered the low power mode.

DETAILED DESCRIPTION

Figure 1:
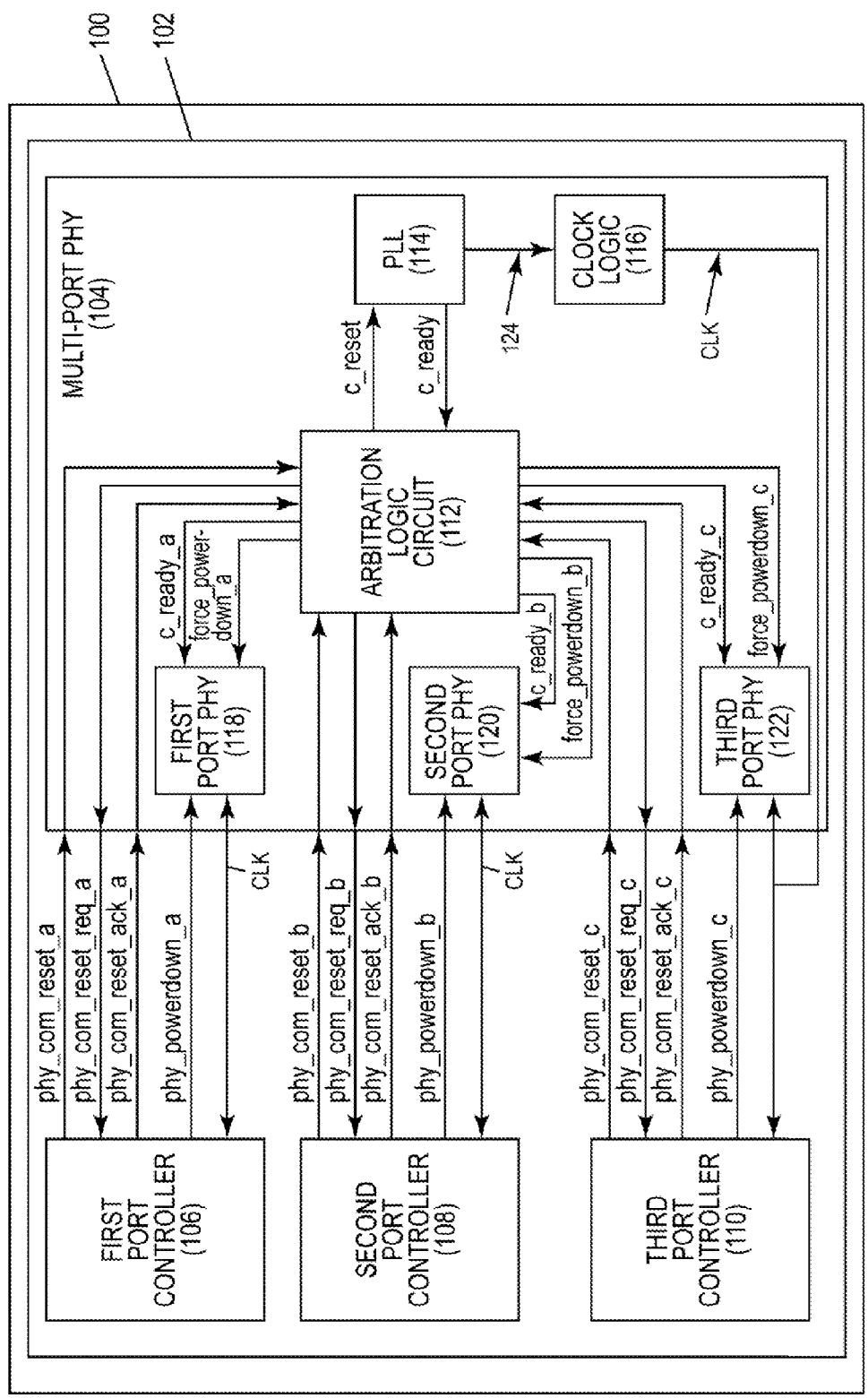
FIG. 1 is a block diagram of an exemplary integrated circuit (IC) including an exemplary multi-port physical layer (PHY)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include shared control of a phase locked loop (PLL) for a multi-port physical layer (PHY). In particular, an arbitration logic circuit according to exemplary aspects of the disclosure is coupled to ports of a multi-port PHY sharing a PLL. Upon receiving an indication that the shared PLL is to be reset or re-initialized by one of the ports, the arbitration logic circuit commands the other ports sharing the PLL to enter a state in which a reset of the shared PLL would have minimal or no adverse effect in their operations. In this manner, an integrated circuit (IC) including a multi-port PHY may be configured with only one PLL and associated clock logic to provide a clock signal for some or all of its ports, thus reducing the system's semiconductor area and power consumption. Furthermore, the ports of the multi-port PHY may otherwise operate independently from each other, obviating any configuration and/or interoperability problems associated with having a shared PLL.

Before addressing exemplary aspects of the present disclosure, a definition of port is provided so that this non-standard term is interpreted properly. As used herein, a port is a component of an IC that uses a bus link to communicate with other ICs of a system. In exemplary aspects, the link may be a single-lane link. However, the present disclosure is not so limited, and a link may be a multi-lane link without departing from the spirit of the disclosure. Furthermore, each port of an IC transmits/receives data independently from other ports within the same IC, and thus, data on lanes belonging to different ports is not interrelated.

In this regard, FIG. 1 is a block diagram of an IC 100 including an exemplary multi-port PHY system 102. The multi-port PHY system 102 includes a multi-port PHY 104, a first port controller 106, a second port controller 108, and a third port controller 110 each with an associated port (not illustrated). These port controllers may be referred to hereinafter as means for controlling a port of the multi-port PHY 104. While three ports are contemplated, it should be appreciated that exemplary aspects of the present disclosure are suitable for use with a multi-port PHY system that has two or more ports. Returning to FIG. 1, the IC 100 may be integrated in, for example, a device configured to communicate with other devices through one or more physical layer transmission technologies, including, without limitation, Institute of Electrical and Electronics Engineers (IEEE) 802.3 or Ethernet, IEEE 802.11 or Wi-Fi, and BLUETOOTH™. In this regard, each of the first port controller 106, the second port controller 108, and the third port controller 110 may facilitate communication at the physical layer level between the devices according to one or more of such physical layer transmission technologies.

With continued reference to FIG. 1, the multi-port PHY 104 includes an arbitration logic circuit 112, a PLL 114, and a clock logic 116. The arbitration logic circuit 112 may be referred to in the disclosure as a means for arbitrating a reset of the PLL 114, and the PLL 114 may be referred to in the disclosure as a means for generating a clock signal. The multi-port PHY 104 further includes a first port PHY 118, a second port PHY 120, and a third port PHY 122. The arbitration logic circuit 112 is coupled to the PLL 114, the first port PHY 118, the second port PHY 120, and the third port PHY 122 to arbitrate a reset or re-initialization of the PLL 114. The first port PHY 118 is configured to communicate with the first port controller 106, the second port PHY 120 is configured to communicate with the second port controller 108, and the third port PHY 122 is configured to communicate with the third port controller 110.

With continued reference to FIG. 1, in an exemplary aspect, the port controllers 106, 108, and 110 correspond to ports that are distinct Peripheral Component Interconnect Express (PCIe) link lanes. PCIe is a computer bus or expansion card standard for connecting hardware devices. PCIe is based on point-to-point topology, with separate serial links connecting every device to a root complex (host). The PCIe link between two hardware devices can consist of anywhere from one to thirty-two (32) lanes, and each lane is used as a full-duplex byte stream, transporting data packets in an eight-bit "byte" format simultaneously in both directions between endpoints of a link. In an exemplary aspect, each port corresponding to one of the port controllers 106, 108, and 110 is associated with a corresponding single-lane link. However, the present disclosure is not so limited, and some or all of the ports corresponding to one of the port controllers 106, 108, and 110 may be associated with a multi-lane link without departing from the spirit of the disclosure. Furthermore, some or all of the links (whether single-lane or multi-lane) may be between the multi-port PHY 104 and distinct ports of a single remote IC, or between the multi-port PHY 104 and distinct ports of multiple distinct remote ICs, without departing from the spirit of the disclosure. Further still, although the present discussion relates to a PCIe-compatible environment, the present disclosure is not so limited, and principles disclosed herein may be applied to environments compatible with other bus standards, such as Universal Serial Bus (USB) version 3 (USB3) without departing from the spirit of the disclosure.

With continued reference to FIG. 1, the PLL 114 provides a PLL signal 124 to the clock logic 116 to generate a clock signal (CLK). The multi-port PHY 104 is configured such that the PLL 114 is the only PLL used to provide a PLL signal to generate the clock signal CLK to the port controllers 106, 108, and 110 and port PHYs 118, 120, and 122, thus obviating the need for a separate PLL and any associated clock logic circuit for each of the port controllers 106, 108, and 110 and port PHYs 118, 120, and 122. This allows a reduction in the semiconductor area and power consumption of the multi-port PHY system 102. To avoid problems for other ports when one of the port controllers 106, 108, and 110 requests a reset of the PLL 114, the arbitration logic circuit 112 is configured to coordinate the sharing of the PLL 114. Various signals are illustrated in FIG. 1. More detail on these signals is provided below with reference to FIGS. 3 and 5.

Figure 2:
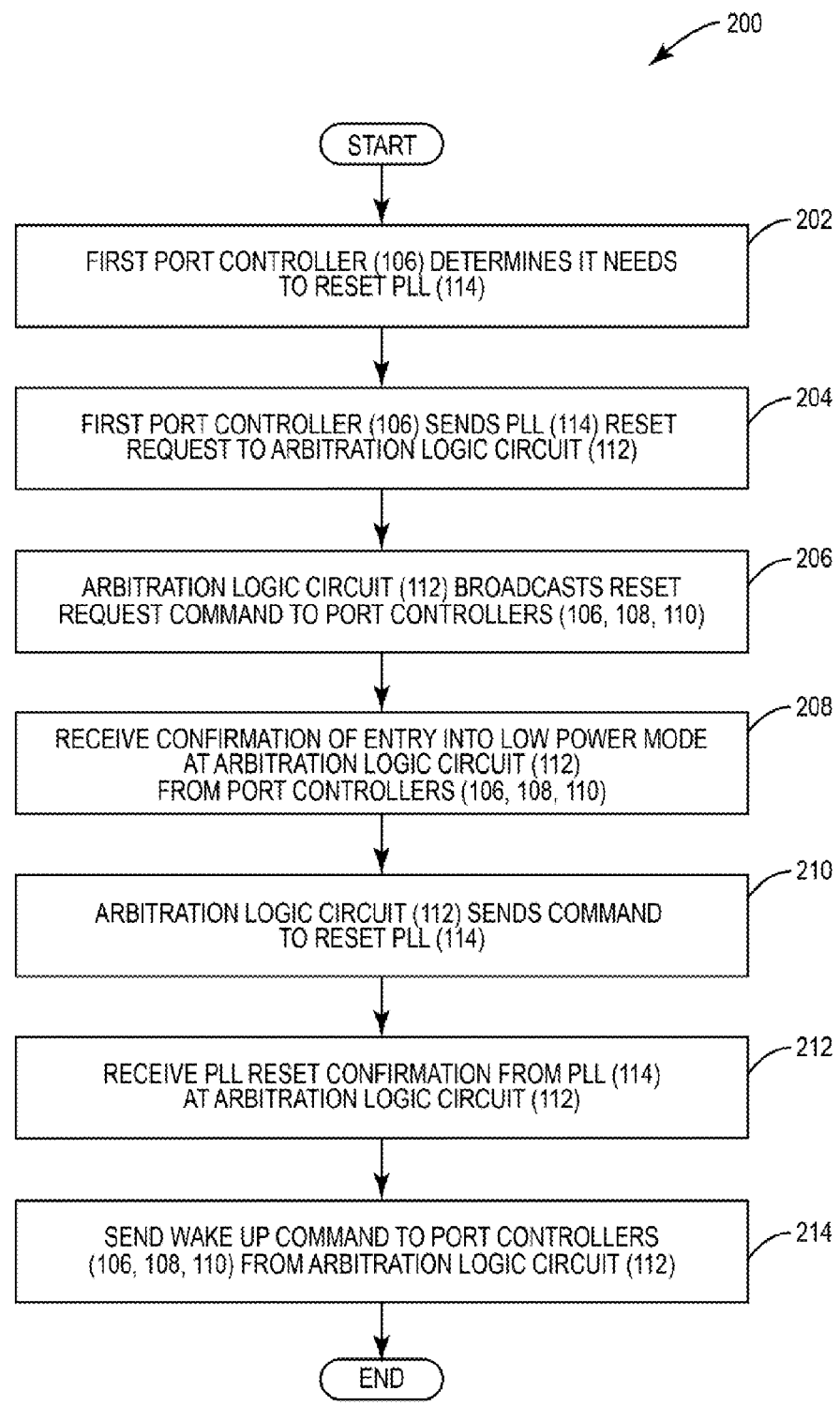
FIG. 2 is a flowchart illustrating an exemplary process for resetting a phase locked loop (PLL)

In this regard, FIG. 2 is a flowchart illustrating an exemplary process 200 for resetting the PLL 114 illustrated in FIG. 1. The process 200 begins with the first port controller 106 determining that it needs to reset the PLL 114 (block 202). Such determination may be made, for example, because the clock signal (sometimes referred to herein as CLK) at the first port controller 106 is no longer synchronized with a remote element, a reset of an associated port has failed, the associated link is down, etc. The first port controller 106 then sends a message to the arbitration logic circuit 112 requesting that the PLL 114 be reset (block 204). The arbitration logic circuit 112 then broadcasts a reset request command to the port controllers 106, 108, and 110 (block 206). The reset request command will cause the port controllers 106, 108, and 110 to conclude any ongoing transaction(s), flush any associated data, and enter a low power mode. Furthermore, the arbitration logic circuit 112 may broadcast a power down command to the port PHYs 118, 120, and 122, or the port controllers 106, 108, and 110 may send a message to their respective PHYs, to enter a low power mode, without departing from the spirit of the disclosure.

With continued reference to FIG. 2, the arbitration logic circuit 112 receives confirmation that the port controllers 106, 108, and 110 have entered a low power mode (block 208). The arbitration logic circuit 112 then sends a command to reset the PLL 114 (block 210). The arbitration logic circuit 112 receives a signal from the PLL 114 confirming reset of the PLL 114 (block 212). Once the PLL 114 has settled, the arbitration logic circuit 112 sends a wake up command to all the port controllers 106, 108, and 110 (block 214).

Accordingly, the port controllers 106, 108, and 110 may operate independently from each other obviating any configuration and/or interoperability problems associated with sharing the PLL 114 and any associated clock logic circuits. Specifically, a PLL reset requested by the second port controller 108 will not cause an unexpected disruption in the PLL signal 124 (see FIG. 1) on the first port controller 106. Instead, the arbitration logic circuit 112 requests that the port controllers 106, 108, and 110 enter into a low power mode such that the first port controller 106 does not depend on the PLL signal 124 during the reset of the PLL 114, and sets the first port controller 106 to exit the low power mode after the reset of the PLL 114.

For example, the first port PHY 118 may be directed to a communication through IEEE 802.11/Wi-Fi, the second port PHY 120 may be directed to a communication through BLUETOOTH™ that is distinct from and unrelated to the communication through the first port PHY 118, and the third port PHY 122 may be directed to a communication with a solid-state device for storage. In this example, the IC 100 presents itself as having three independent PCIe PHYs that can connect to three completely different and totally unrelated high performance devices. Furthermore, a reset to a shared PLL 114 from one of the port controllers 106, 108, or 110 would not cause communication errors and/or loss of data in the other ports of the multi-port PHY 104.

Figure 3:
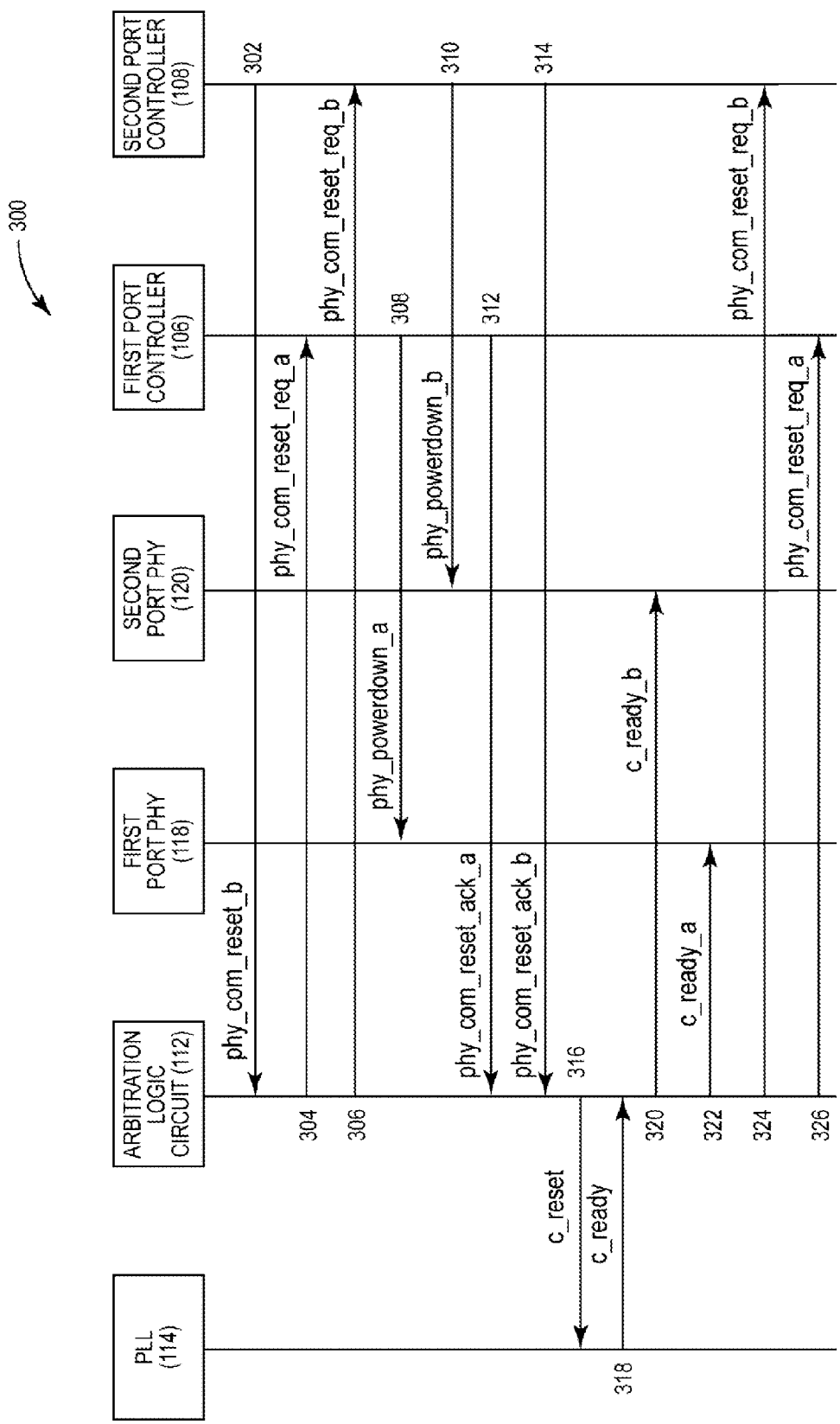
FIG. 3 is a message sequence chart illustrating an exemplary PHY communication.

FIG. 3 is an exemplary message sequence chart 300 illustrating an exemplary PHY communication for the multi-port PHY system 102 illustrated in FIG. 1 that is consistent with the exemplary process 200 illustrated in flowchart form in FIG. 2. For purposes of describing the exemplary message sequence chart 300, the first port controller 106 and the second port controller 108 share the PLL 114, and the third port controller 110 is omitted for clarity, not as a limitation. At 302, the second port controller 108 sends message phy_com_reset_b to the arbitration logic circuit 112. This may occur, for example, because the second port controller 108 has experienced a problem regarding its clock, or with the link, and needs to reset the PLL 114 to recover from the problem. At 304, the arbitration logic circuit 112 sends a message containing a phy_com_reset_req_a command to the first port controller 106 to request the first port controller 106 to enter a low power mode. At 306, the arbitration logic circuit 112 sends a message containing a phy_com_reset_req_b command to the second port controller 108 to request the second port controller 108 to enter a low power mode.

At 308, the first port controller 106 sends message phy_powerdown_a to the first port PHY 118 to set the first port PHY 118 to a low power mode. At 310, the second port controller 108 sends message phy_powerdown_b to the second port PHY 120 to set the second port PHY 120 to a low power mode.

With continued reference to FIG. 3, at 312 the first port controller 106 sends message phy_com_reset_ack_a to the arbitration logic circuit 112 to acknowledge the reset request and indicate that the first port controller 106 has entered the low power mode. At 314 the second port controller 108 sends message phy_com_reset_ack_b to the arbitration logic circuit 112 to acknowledge the reset request and indicate that the second port controller 108 has entered the low power mode.

At 316, the arbitration logic circuit 112 sends message c_reset to the PLL 114 to reset the PLL 114. At 318, the PLL 114 sends message c_ready to the arbitration logic circuit 112 to indicate that the PLL 114 has completed the reset and is ready to provide the PLL signal 124 to the clock logic 116 to generate the CLK signal. At 320 the arbitration logic circuit 112 sends message c_ready_b to the second port PHY 120, and at 322 the arbitration logic circuit 112 sends message c_ready_a to the first port PHY 118 to power up the second port PHY 120 and the first port PHY 118, respectively. At 324 the arbitration logic circuit 112 deasserts message phy_com_reset_req_b to the second port controller 108, and at 326 the arbitration logic circuit 112 deasserts message phy_com_reset_req_a to the first port controller 106 to indicate to the port controllers 106 and 108 that the reset of the PLL 114 has completed. This allows the port controllers 106 and 108 to operate using the CLK signal generated by the clock logic 116 based on the PLL signal 124.

In the aspect of the disclosure illustrated in the exemplary process 200 in FIG. 2, and in the exemplary message sequence chart 300 in FIG. 3, the arbitration logic circuit 112 broadcasts a reset request command to the port controllers 106, 108, and 110 (block 206 and at 304, 306), but does not provide a command to the port PHYs 118, 120, and 122 to power down. In this aspect of the disclosure, the port controllers 106, 108, and 110 are configured to provide a phy_powerdown_x command to their respective port PHYs 118, 120, and 122, as shown at 308 and 310 in FIG. 3. However, the process of powering down the port PHYs 118, 120, and 122 may be performed by the arbitration logic circuit 112, without departing from the spirit of the disclosure.

Figure 4:
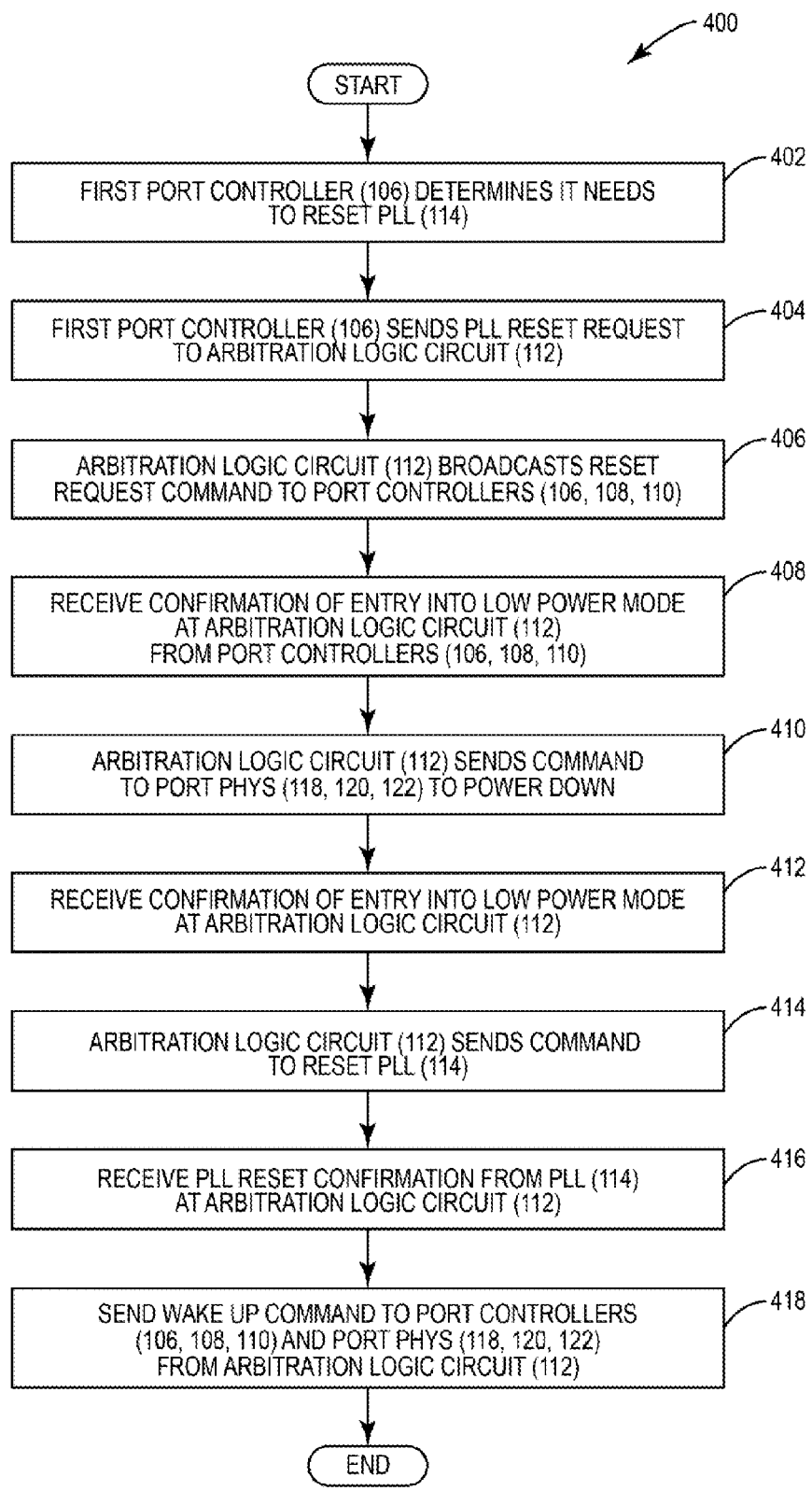
FIG. 4 is a flowchart illustrating another exemplary process for resetting a PLL.

In that regard, FIG. 4 is a flowchart illustrating an exemplary process 400 for resetting the PLL 114 illustrated in FIG. 1, where the process of powering down the port PHYs 118, 120, and 122 is performed by the arbitration logic circuit 112. The process 400 begins with the first port controller 106 determining that it needs to reset the PLL 114 (block 402). Such determination may be made, for example, because the clock signal at the first port controller 106 is no longer synchronized with a remote element, a reset of an associated port has failed, the associated link is down, etc. The first port controller 106 then sends a message to the arbitration logic circuit 112 requesting that the PLL 114 be reset (block 404). The arbitration logic circuit 112 then broadcasts a reset request command to the port controllers 106, 108, and 110 (block 406). The reset request command will cause the port controllers 106, 108, and 110 to conclude any ongoing transaction(s), flush any associated data, and enter a low power mode. The arbitration logic circuit 112 then receives confirmation that the port controllers 106, 108, and 110 have entered a low power mode (block 408).

The arbitration logic circuit 112 then broadcasts a command to the port PHYs 118, 120, and 122 to force the port PHYs 118, 120, and 122 to power down (block 410). The arbitration logic circuit 112 receives confirmation that the port PHYs 118, 120, and 122 have entered a low power mode (block 412).

The arbitration logic circuit 112 then sends a command to reset the PLL 114 (block 414). The arbitration logic circuit 112 receives a signal from the PLL 114 confirming reset of the PLL 114 (block 416). Once the PLL 114 has settled, the arbitration logic circuit 112 sends a wake up command to all the port controllers 106, 108, and 110 and to the port PHYs 118, 120, and 122 (block 418).

Accordingly, the port controllers 106, 108, and 110 may operate independently from each other obviating any configuration and/or interoperability problems associated with sharing the PLL 114 and any associated clock logic circuits. Specifically, a PLL reset requested by the second port controller 108 will not cause an unexpected disruption in the PLL signal 124 (see FIG. 1) on the first port controller 106. Instead, the arbitration logic circuit 112 requests that the port controllers 106, 108, and 110, as well as the port PHYs 118, 120, and 122, enter into a low power mode such that the first port controller 106 does not depend on the PLL signal 124 during the reset of the PLL 114, and sets the first port controller 106 to exit the low power mode after the reset of the PLL 114. Thus, for example, the first port PHY 118 may be directed to a communication through IEEE 802.11 or Wi-Fi independently from a communication through the second port PHY 120, which may be directed to a communication through BLUETOOTH™ that is distinct from and unrelated to the communication through the first port PHY 118. Thus, a reset to a shared PLL from the second port controller would not cause communication errors and/or loss of data in the other ports of the multi-port PHY.

Figure 5:
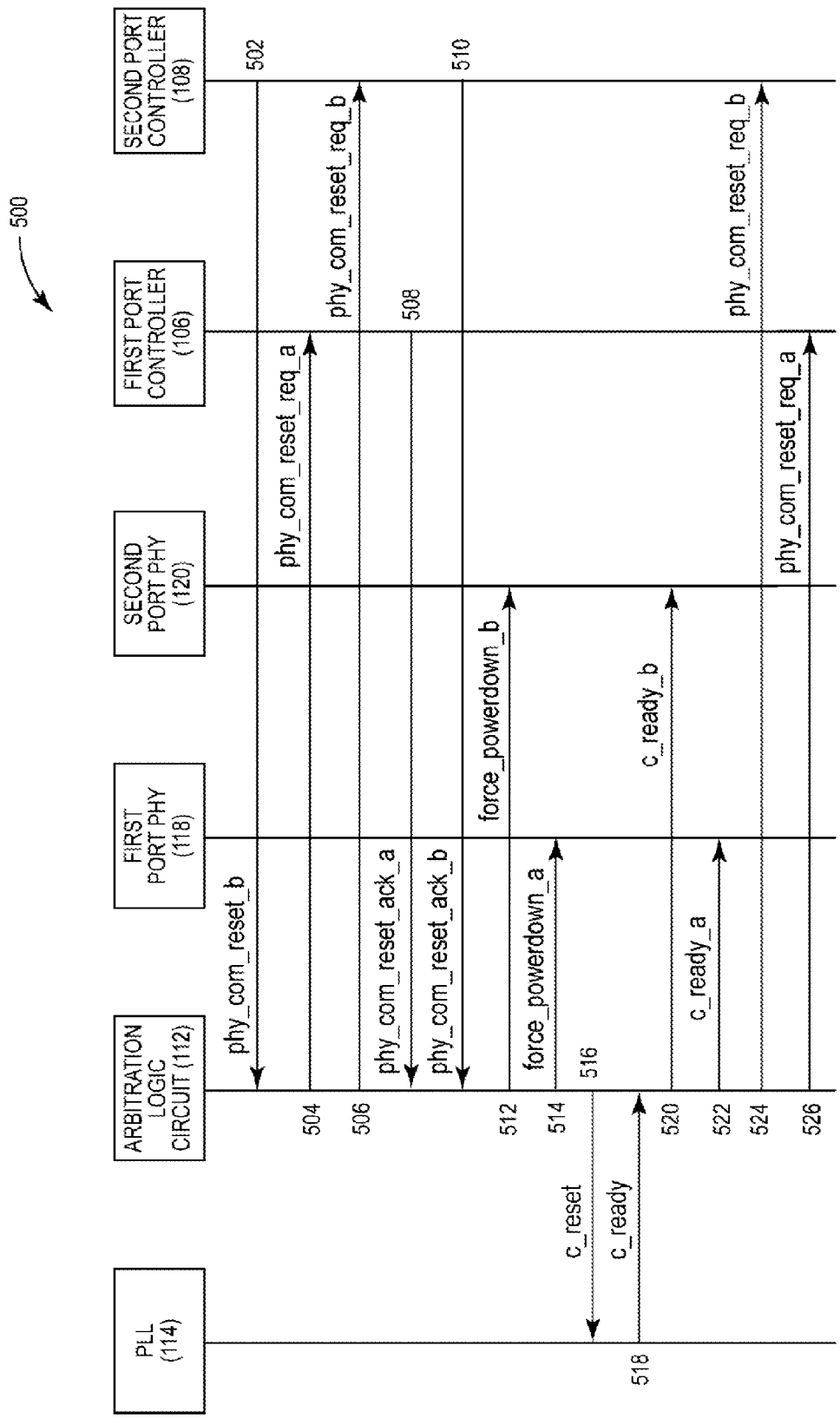
FIG. 5 is a message sequence chart illustrating another exemplary PHY communication.

FIG. 5 is an exemplary message sequence chart 500 illustrating an exemplary PHY communication for the multi-port PHY system 102 illustrated in FIG. 1 that is consistent with the exemplary process 400 illustrated in flowchart form in FIG. 4. For purposes of describing the exemplary message sequence chart 500, the first port controller 106 and the second port controller 108 share the PLL 114, and the third port controller 110 is omitted for clarity, not as a limitation. At 502, the second port controller 108 sends message phy_com_reset_b to the arbitration logic circuit 112. This may occur, for example, because the second port controller 108 has experienced a problem regarding its clock, or with the link, and needs to reset the PLL 114 to recover from the problem. At 504, the arbitration logic circuit 112 sends a message containing phy_com_reset_req_a command to the first port controller 106 to request the first port controller 106 to enter a low power mode. At 506, the arbitration logic circuit 112 sends a message containing phy_com_reset_req_b command to the second port controller 108 to request the second port controller 108 to enter a low power mode.

At 508 the first port controller 106 sends message phy_com_reset_ack_a to the arbitration logic circuit 112 to acknowledge the reset request and indicate that the first port controller 106 has entered the low power mode. At 510 the second port controller 108 sends message phy_com_reset_ack_b to the arbitration logic circuit 112 to acknowledge the reset request and indicate that the second port controller 108 has entered the low power mode.

In this case, the first port controller 106 and the second port controller 108 are not configured to power down their respective PHYs. In this regard, at 512, the arbitration logic circuit 112 sends message force_powerdown_b to the second port PHY 120 to set the second port PHY 120 to a low power mode. At 514, the arbitration logic circuit 112 sends message force_powerdown_a to the first port PHY 118 to set the first port PHY 118 to a low power mode. Thus, the port controllers 106 and 108, and the port PHYs 118 and 120 are in the low power mode such that the PLL 114 can be reset without communication errors and/or loss of data.

At 516, the arbitration logic circuit 112 sends message c_reset to the PLL 114 to reset the PLL 114. At 518, the PLL 114 sends message c_ready to the arbitration logic circuit 112 to indicate that the PLL 114 has completed the reset and is ready to provide the PLL signal 124 to the clock logic 116 to generate the CLK signal. At 520 the arbitration logic circuit 112 sends message c_ready_b to the second port PHY 120, and at 522 the arbitration logic circuit 112 sends message c_ready_a to the first port PHY 118 to power up the second port PHY 120 and the first port PHY 118, respectively. At 524 the arbitration logic circuit 112 deasserts phy_com_reset_req_b to the second port controller 108, and at 526 the arbitration logic circuit 112 deasserts phy_com_reset_req_a to the first port controller 106 to indicate to the port controllers 106 and 108 that the reset of the PLL 114 has completed. This allows the port controllers 106 and 108 to operate using the CLK signal generated by the clock logic 116 based on the PLL signal 124.

The shared control of a PLL for a multi-port PHY according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
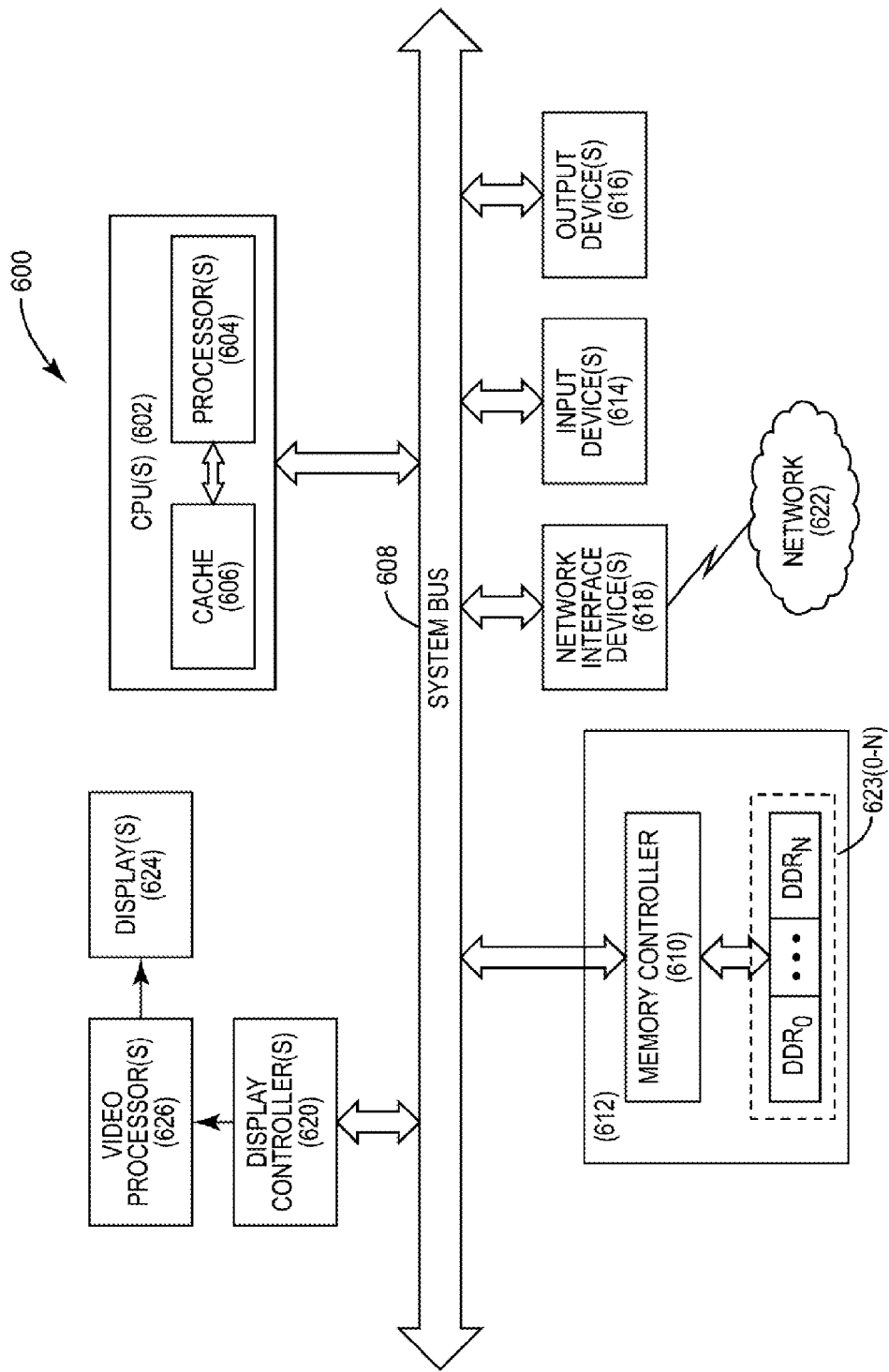
FIG. 6 is a block diagram of an exemplary processor-based system that can include the exemplary IC including the exemplary multi-port PHY of FIG. 1.

In this regard, FIG. 6 illustrates an example of a processor-based system 600 that can employ the IC 100 including the exemplary multi-port PHY system 102 illustrated in FIG. 1. In this example, the processor-based system 600 includes one or more central processing units (CPUs) 602, each including one or more processors 604. The CPU(s) 602 may be a master device. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device. Although not illustrated in FIG. 6, multiple system buses similar to the system bus 608 could be provided, wherein each of the multiple system buses constitutes a different fabric.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including but not limited to audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 623(0-N).

The CPU(s) 602 may also be configured to access the display controller(s) 620 over the system bus 608 to control information sent to one or more displays 624. The display controller(s) 620 sends information to the display(s) 624 to be displayed via one or more video processors 626, which process the information to be displayed into a format suitable for the display(s) 624. The display(s) 624 can include any type of display, including, but not limited to, a cathode ray tube (CRT), a liquid crystal display (LCD), a plasma display, a light emitting diode (LED) display, etc.

Those skilled in the art will appreciate that although the present disclosure has been described relative to a PCIe-compatible environment, the present disclosure is not so limited, and the principles disclosed herein may be applied to environments compatible with other bus standards, such as Universal Serial Bus (USB) version 3 (USB3) without departing from the spirit of the disclosure.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for controlling a multi-port physical layer (PHY), comprising:
    providing, by an arbitration logic circuit coupled to a plurality of port controllers of a multi-port PHY and to a phase locked loop (PLL) of the multi-port PHY, a command to enter a low power mode to a first port controller of the plurality of port controllers in response to a PLL reset request from a second port controller of the plurality of port controllers; and
    providing, by the arbitration logic circuit, a PLL reset command to the PLL in response to an indication that the first port controller has entered the low power mode.

2. The method of claim 1, wherein the first port controller is independent from the second port controller.

3. The method of claim 1, wherein each port controller of the plurality of port controllers is independent from all other port controllers of the plurality of port controllers.

4. The method of claim 1, wherein the first port controller and the second port controller are coupled to the PLL.

5. The method of claim 1, wherein the plurality of port controllers are coupled to the PLL.

6. The method of claim 1, wherein the first port controller and the second port controller correspond to distinct Peripheral Component Interface Express (PCIe) link lanes.

7. The method of claim 1, further comprising:
providing, by the arbitration logic circuit, a command to exit the low power mode to the first port controller and to the second port controller in response to an indication that the PLL is reset.

8. The method of claim 1, wherein the plurality of port controllers are coupled to the PLL to generate a corresponding plurality of clock signals and each port controller of the plurality of port controllers is independent from all other port controllers of the plurality of port controllers, the method further comprising:
providing, by the arbitration logic circuit, the command to enter the low power mode to the plurality of port controllers other than the first port controller, in response to the PLL reset request from the second port controller.

9. The method of claim 8, further comprising providing, by the arbitration logic circuit, a command to exit the low power mode to the plurality of port controllers in response to an indication that the PLL is reset.

10. The method of claim 1, further comprising providing, from the arbitration logic circuit to a port PHY, a PHY command to enter the low power mode.

11. The method of claim 1, further comprising providing, from the arbitration logic circuit to a port PHY, a PHY command to exit the low power mode.

12. An integrated circuit (IC) comprising:
an arbitration logic circuit;
a phase locked loop (PLL) coupled to the arbitration logic circuit; and
a plurality of port controllers of a multi-port physical layer (PHY), wherein at least a first port controller and a second port controller of the plurality of port controllers are coupled to the PLL;
the arbitration logic circuit configured to:
provide a command to enter a low power mode to the first port controller in response to a PLL reset request from the second port controller; and
provide a PLL reset command to the PLL in response to an indication that the first port controller has entered the low power mode.

13. The IC of claim 12, wherein the first port controller is configured to operate independently from the second port controller.

14. The IC of claim 12, wherein the first port controller and the second port controller are coupled to the PLL.

15. The IC of claim 12, wherein the first port controller and the second port controller are configured to operate as distinct Peripheral Component Interface Express (PCIe) link lanes.

16. The IC of claim 12, wherein the arbitration logic circuit is further configured to provide a command to exit the low power mode to the first port controller and to the second port controller in response to an indication that the PLL is reset.

17. The IC of claim 12, further comprising a first port PHY associated with a first one of the plurality of port controllers.

18. The IC of claim 17, wherein the arbitration logic circuit is further configured to instruct the first port PHY to enter the low power mode.

19. The IC of claim 18, wherein the arbitration logic circuit is further configured to instruct the first port PHY to exit the low power mode.

20. The IC of claim 12 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

21. An integrated circuit (IC) comprising:
a means for arbitrating a reset of a means for generating a clock signal, the means for generating the clock signal coupled to the means for arbitrating the reset; and
a plurality of means for controlling a port of a multi-port physical layer (PHY), wherein at least a first means for controlling a first port and a second means for controlling a second port of the plurality of means for controlling a port are coupled to the means for generating the clock signal;
the means for arbitrating the reset configured to:
provide a command to enter a low power mode to the first means for controlling the first port in response to a phase locked loop (PLL) reset request from the second means for controlling the second port; and
provide a PLL reset command to the means for generating the clock signal in response to an indication that the first means for controlling the first port has entered the low power mode.

22. The IC of claim 21, wherein the first means for controlling the first port is configured to operate independently from the second means for controlling the second port.

23. The IC of claim 21, wherein the first means for controlling the first port and the second means for controlling the second port are coupled to the PLL.

24. The IC of claim 21, wherein the first means for controlling the first port and the second means for controlling the second port are configured to operate as distinct Peripheral Component Interface Express (PCIe) link lanes.

25. The IC of claim 21, wherein the means for arbitrating the reset is further configured to provide a command to exit the low power mode to the first means for controlling the first port and the second means for controlling the second port in response to an indication that the PLL is reset.

* * * * *